(12) United States Patent
Lilliott et al.

(10) Patent No.: US 7,072,466 B2
(45) Date of Patent: *Jul. 4, 2006

(54) METHOD AND APPARATUS FOR CANCELING ECHO IN A TELEPHONE COMMUNICATION SYSTEM

(75) Inventors: Neil Lilliott, Redhill (GB); Andrew D. Laney, Addlestone (GB)

(73) Assignee: Xilinx, Inc., San Jose, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 10/460,990

(22) Filed: Jun. 13, 2003

(65) Prior Publication Data

US 2003/0231763 A1 Dec. 18, 2003

Related U.S. Application Data

(63) Continuation-in-part of application No. 10/173,200, filed on Jun. 14, 2002, now Pat. No. 6,963,643.

(51) Int. Cl.
*H04M 9/08* (2006.01)

(52) U.S. Cl. ........................ 379/406.08; 379/406.01; 379/406.06

(58) Field of Classification Search ........... 379/406.01, 379/406.06, 406.08
See application file for complete search history.

(56) References Cited

U.S. PATENT DOCUMENTS 5,414,766 A * 5/1995 Cannalire et al. ...... 379/406.08
6,654,463 B1 * 11/2003 Leonidov et al. ...... 379/406.08

FOREIGN PATENT DOCUMENTS

DE  44 18 792 A  11/1995
EP  0 272 714 A   6/1988

OTHER PUBLICATIONS

U.S. Appl. No. 10/173,200, filed Jun. 14, 2002, Lilliott et al.

* cited by examiner

*Primary Examiner*—Jefferey F. Harold
(74) *Attorney, Agent, or Firm*—W. Eric Webostad; Justin Liu

(57) ABSTRACT

Method and apparatus for signal reflection removal, such as echo cancellation, is described. Signal samples are delayed. The delays allow burst processing of consecutive samples of transmitting and receiving signals in a communication network, such as in a telephone communication system. As a result, there is tremendous reduction of memory bandwidth when compared to conventional sample-by-sample processing of signals. Echo cancellers described herein can be implemented in an FPGA. Echo in over a thousand channels can be cancelled using an FPGA and an external memory device. In embodiments for reflected signal cancellation, multiple stages of echo estimation are used.

20 Claims, 11 Drawing Sheets

METHOD AND APPARATUS FOR CANCELING ECHO IN A TELEPHONE COMMUNICATION SYSTEM

CROSS-REFERENCE TO RELATED APPLICATIONS

This application claims benefit to U.S. patent application Ser. No. 10/173,200, filed Jun. 14, 2002, entitled "Method and Apparatus for Canceling Echo in a Telephone Communication System" by Neil Lilliott, which is incorporated herein by reference in its entirety.

FIELD OF THE INVENTION

One or more aspects of the present invention generally relate to network communications and more particularly, to echo cancellation in telephonic communication systems.

BACKGROUND OF THE INVENTION

Recently, there have been significant new uses of telephonic communications. One example is the tremendous growth in digital cellular telephones. Another example is the use of packet-based data networks, such as those conforming to the Internet Protocol (IP), to carry voice communications. This technology of carrying sound over a packet-based data network is called voice-over IP (VoIP). In VoIP applications, voice signals are digitized and travel on digital communication channels. The digital data is processed, conventionally using one or more digital signal processors (DSPs) or field programmable gate arrays (FPGAs).

A problem in telephony is "echo." In telephony, "echo" is defined as the reflection of the caller's voice back to the caller through the phone lines. Echo cancellation is use to reduce or eliminate echo in telephonic communications. There are several causes of echo. For example, "line" echo is created when an electrical signal encounters an impedance mismatch at one end of the line causing substantial signal reflection, such as that caused by a 2 to 4 wire hybrid conversion from analog to digital communication systems. Conventionally, computations for echo cancellation are performed on a sample-by-sample basis in real time. One problem with sample-by-sample computation is that significantly large memory bandwidth is employed for real-time processing.

Additionally, echo is exacerbated by distance or echo path length delay. The longer an echo is delayed the more likely it will have a negative effect on quality of service. Echo delayed by 30 milliseconds ("ms") or more is generally noticeable to the user, and delays greater than 50 ms have a pronounced negative affect on the quality of service, namely, making telephonic conversation problematic for the users. Echo path length delay of course depends in part on where in a system an echo is created, and thus cancellation of an echo with an echo path length delay of approximately 16 ms or greater is desirable and useful to promote quality of service. However, there may be instances where echo path delay is equal to or less than 16 ms. Because sound is now digitized for communication over a digital network or sub-network ("subnet"), even such a short echo path delay can negatively impact quality of service.

The International Telecommunications Union ("ITU") has come out with a specification for digital network echo cancellers, namely, ITU G.168. To comply with a portion of this specification, a digital network echo canceller must have a minimum path delay greater than zero milliseconds, but to fully conform to this portion of ITU G.168, echo cancellation for a path delay of zero milliseconds must be possible, though a 1 ms echo path delay is allowed. For integrated circuits, such as Application Specific Integrated Circuits (ASICs) and DSPs, manufactured with sufficient internal memory, echo cancellation for echo path delays equal to or less than 16 ms is possible. However, manufacturing an integrated circuit with sufficient memory bandwidth for echo cancellation for a 16 ms or less threshold adds significant cost.

Accordingly, it would be desirable and useful to provide a digital network echo canceller that complies with echo cancellation for a minimum path delay of possibly zero milliseconds. Furthermore, it would be desirable and useful to provide a digital network echo canceller that allows for echo cancellation for a minimum path delay equal to or less than 16 ms that uses external memory for buffering data.

SUMMARY OF THE INVENTION

An aspect of the present invention involves a method for canceling echo in a telephone communication system. A telephone transmits electrical signals to a central station and receives electrical signals from the central stations. The electrical signals are modulated by audio information. The transmitting signals are digitized to generate m+n digitized transmitting data that correspond to a first time period (n and m are predetermined integer numbers and m>=n). The receiving signals are digitized to generate n digitized receiving data that correspond to a second time period. The second time period is shorter than the first time period and has ending time the same as the first time period. A set of n weights data are calculated using the first n digitized transmitting data and the n digitized receiving data. The echo can be cancelled from the receiving signals at a third time period using the set of n weights data. The third time period follows the second time period and has the same length as the second time period.

An aspect of the present invention is a method for reducing effects associated with a reflected signal, comprising: adaptive finite impulse response filtering to provide weights for transmit data signal samples; calculating partial results responsive to the transmit data signal samples and the weights for a first number of samples; obtaining a first portion of the partial results and a first portion of the transmit data signal samples and the weights associated therewith; calculating second partial results responsive to the first portion of the partial results and the first portion of the transmit data signal samples and the weights associated therewith, the second partial results fewer in number of results than the first portion of the partial results; obtaining the second partial results associated with a second portion of the transmit data signal samples and the weights associated therewith; and calculating an estimate of signal reflection responsive to the second partial results associated with the second portion of the transmit data signal samples and the weights associated therewith.

Another aspect of the present invention is an echo canceller, comprising: a first delay device having a delay, the delay associated with a number of signal samples, the first delay device coupled to receive a transmit signal; a second delay device having the delay, the second delay device coupled to receive a receive signal; a coefficient updater coupled to the first delay device and the second delay device, the coefficient updater including an adaptive finite impulse response filter to provide updated coefficients responsive to the transmit signal and the receive signal; an echo estimator coupled to receive the transmit signal and coupled to the coefficient updater to receive the updated coefficients, the echo estimator configured to provide an estimated echo signal responsive to the updated coefficients and the transmit signal; a third delay device having the delay, the third delay device coupled to the echo estimator to delay the estimated echo signal; and an echo remover coupled to receive the receive signal and the estimated echo signal delayed, the echo remover configured to provide the receive signal less an estimated echo associated with the estimate echo signal.

Another aspect of the present invention is an echo canceller, comprising: a first delay device having a first delay, the first delay associated with a first number of signal samples, the first delay device coupled to receive a transmit signal; a second delay device having the first delay, the second delay device coupled to receive a receive signal; a coefficient updater coupled to the first delay device and the second delay device, the coefficient updater including an adaptive finite impulse response filter to provide updated coefficients responsive to the transmit signal and the receive signal; a first stage echo estimator coupled to the first delay device to receive the transmit signal delayed by the first delay and coupled to the coefficient updater to receive the updated coefficients, the first stage echo estimator configured to provide a first estimated echo signal responsive to the updated coefficients and the first number of signal samples of the transmit signal; a third delay device having the first delay, the third delay device coupled to the first stage echo estimator to delay the first estimated echo signal; a fourth delay device having a second delay, the fourth delay device coupled to receive the transmit signal, the second delay associated with a second number of signal samples, the second number of signal samples being fewer than the first number of signal samples and the second delay being shorter than the first delay; a second stage echo estimator coupled to the fourth delay to receive the transmit signal delayed by the second delay, the second stage echo estimator configured to provide a second estimated echo signal responsive to a portion of the updated coefficients and the second number of signal samples of the transmit signal; a fifth delay device having the second delay, the fifth delay device coupled to receive the receive signal; and an echo remover coupled to receive the receive signal delayed by the fifth delay device, the first estimated echo signal delayed by the third delay device and the second estimated echo signal provided by the second stage echo estimator, the echo remover configured to subtract from the receive signal the first estimated echo signal and the second estimated echo signal to provide the receive signal less an estimated echo associated with the first estimate echo signal and the second estimated echo signal.

Another aspect of the present invention is an echo canceller, comprising: a first delay device having a first delay, the first delay associated with a first number of signal samples, the first delay device coupled to receive a transmit signal; a second delay device having the first delay, the second delay device coupled to receive a receive signal; a coefficient updater coupled to the first delay device and the second delay device, the coefficient updater including an adaptive finite impulse response filter to provide updated coefficients responsive to the transmit signal and the receive signal; a first stage echo estimator coupled to the first delay device to receive the transmit signal delayed by the first delay and coupled to the coefficient updater to receive the updated coefficients, the first stage echo estimator configured to provide a first estimated echo signal responsive to the updated coefficients and the first number of signal samples of the transmit signal; a third delay device having the first delay, the third delay device coupled to the first stage echo estimator to delay the first estimated echo signal; a fourth delay device having a second delay, the fourth delay device coupled to receive the transmit signal, the second delay associated with a second number of signal samples, the second number of signal samples being fewer than the first number of signal samples and the second delay being shorter than the first delay; a second stage echo estimator coupled to the fourth delay device to receive the transmit signal delayed by the second delay, the second stage echo estimator configured to provide a second estimated echo signal responsive to at least a first portion of the updated coefficients and the second number of signal samples of the transmit signal; a fifth delay device having the second delay, the fifth delay device coupled to the second stage echo estimator to delay the second estimated echo signal; a third stage echo estimator coupled to receive the transmit signal, the third stage echo estimator configured to provide a third estimated echo signal responsive to a second portion of the updated coefficients, the second portion less than the first portion; and an echo remover coupled to receive the receive signal, the first estimated echo signal delayed by the third delay device, the second estimated echo signal delayed by the fifth delay device and the third estimated echo signal, the echo remover configured to subtract from the receive signal the first estimated echo signal, the second estimated echo signal and the third estimated echo signal to provide the receive signal less an estimated echo associated with the first estimate echo signal, the second estimated echo signal and the third estimated echo signal.

The above summary of the present invention is not intended to describe each disclosed embodiment of the present invention. The figures and detailed description that follow provide additional example embodiments and aspects of the present invention.

DETAILED DESCRIPTION OF THE INVENTION

The present invention relates to a new method and apparatus for echo cancellation. In the following description, numerous specific details are set forth in order to provide a more thorough understanding of the present invention. However, it will be apparent to one skilled in the art that the present invention can be practiced without one or more of these specific details. In other instances, well-known features have not been described in detail in order to avoid obscuring the present invention.

Figure 1:
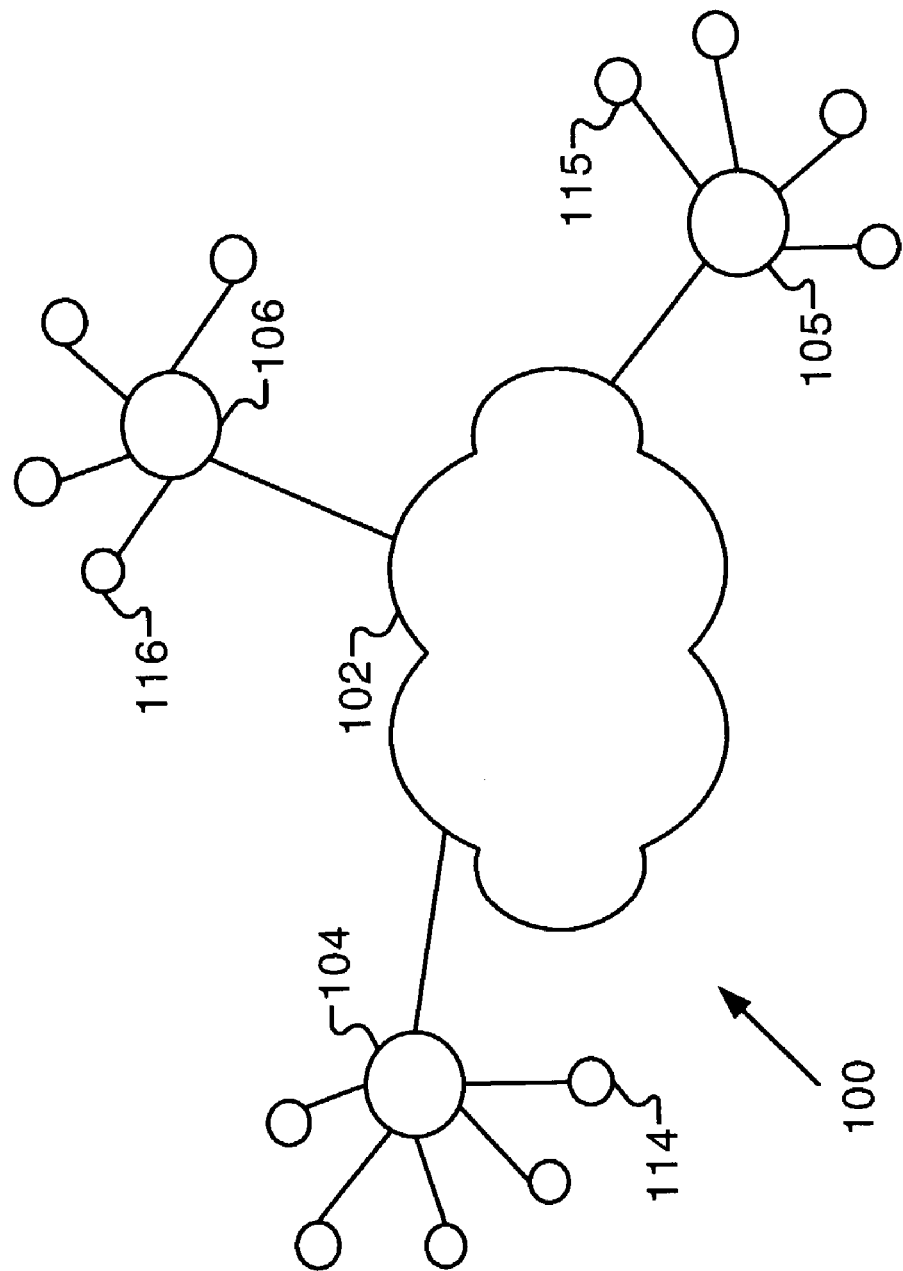
FIG. 1 is a network diagram depicting an exemplary embodiment of a telephonic communication system in which an echo canceller can be implemented.

FIG. 1 is a network diagram depicting an exemplary embodiment of a telephonic communication system 100 in which an echo canceller can be implemented. System 100 includes a portion of a Public Switched Telephone Network ("PSTN") 102 that provides switching among a plurality of Central Offices (COs) 104, 105 and 106. Each CO can serve hundreds or thousands of subscribers (such as subscribers 114–116). PSTN 102 can include a portion of the Internet for VoIP.

Figure 2:
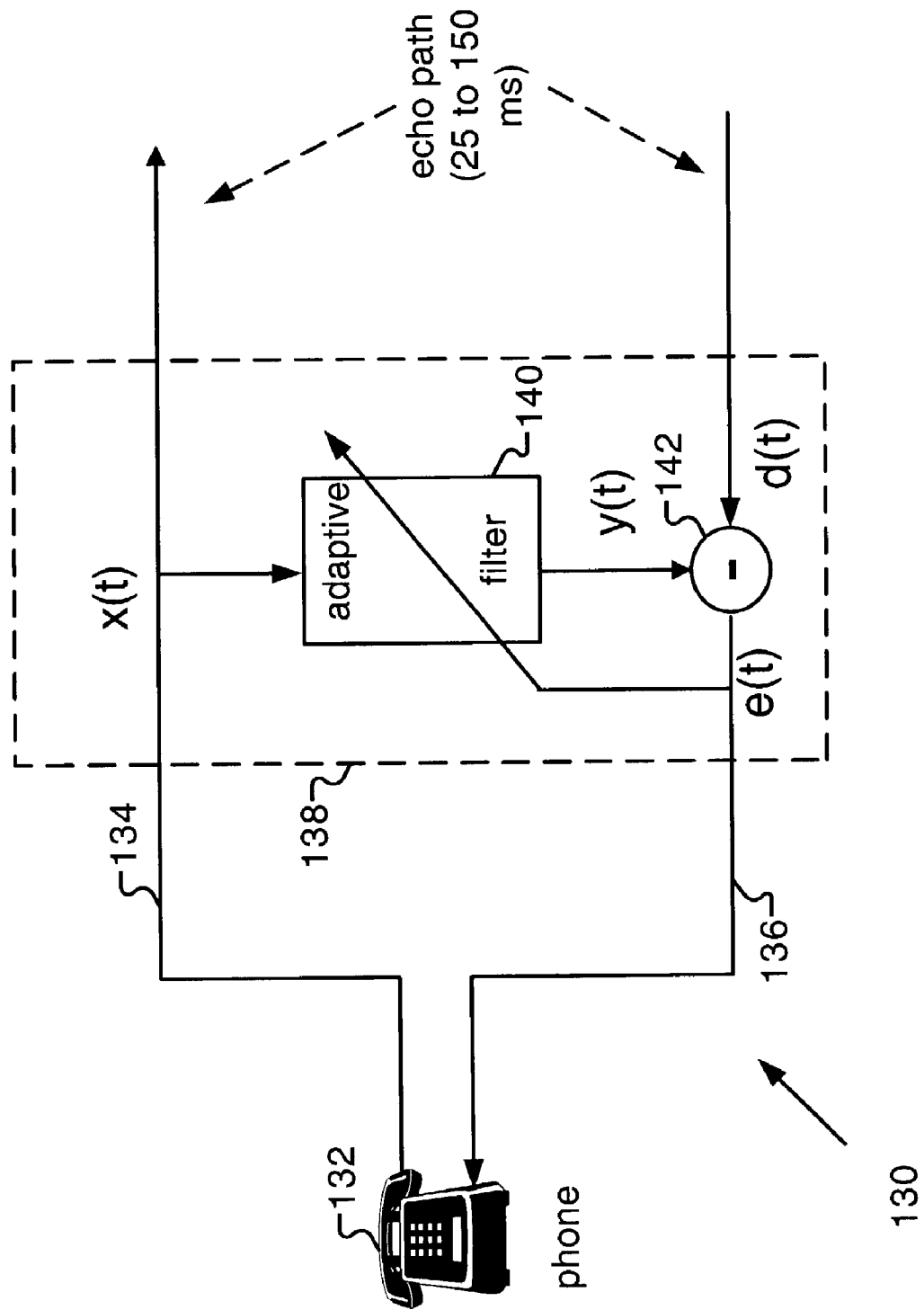
FIG. 2 is a schematic diagram depicting an exemplary embodiment of a portion of the communication system of FIG. 1.

An exemplary embodiment of portion 130 of communication system 100 is depicted in the schematic diagram of FIG. 2. Portion 130 includes telephone 132 that sends electrical signals to a CO of FIG. 1 through a line 134 and receives electrical signals from such a CO through a line 136. The electrical signals are modulated by audio sources (such as the voice of a caller). Portion 130 includes an echo canceller 138 to perform echo cancellation operations. Echo canceller 138 includes an adaptive filter 140 and a subtractor or subtraction node 142. Adaptive filter 140 models an echo, and cancels echo by subtracting a modeled echo signal from an associated echo.

One way to implement echo canceller 138 is in digital circuitry. Transmitting analog signals, X(t), and returning analog signals, d(t), are respectively sampled and converted to digital data. Adaptive filter 140 and subtraction node 142 are instantiated using digital computational means (such as DSPs and FPGAs). Adaptive filter 140 and subtraction node 142 process digital data representing signals X(t) and d(t).

Figure 3:
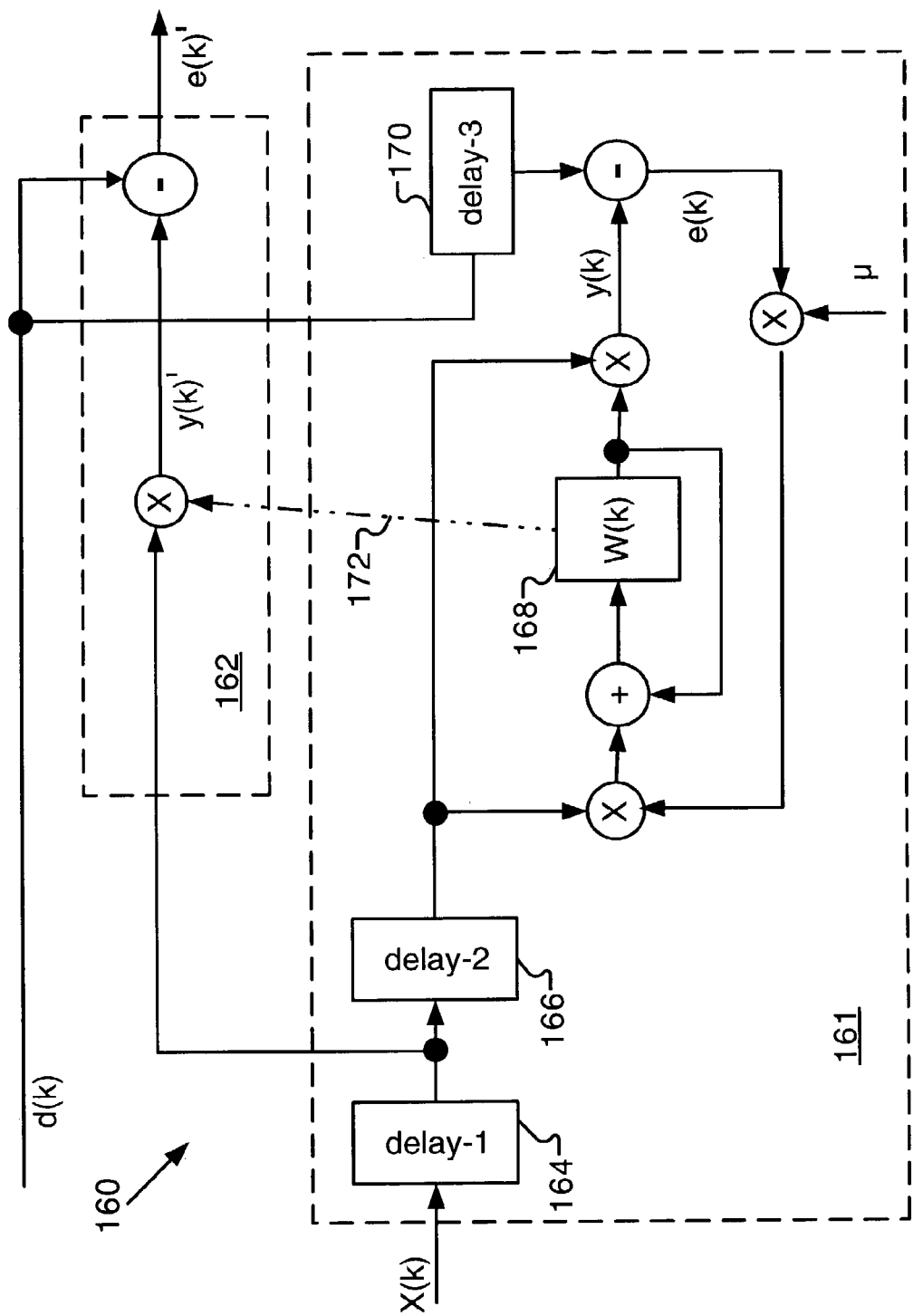
FIG. 3 is a schematic diagram depicting an exemplary embodiment of an echo canceller.

An aspect of the present invention is to introduce appropriate delays at appropriate points in one or more signal paths for processing signals X(t) and d(t). This has the effect of reducing memory bandwidth. FIG. 3 is a schematic diagram depicting an exemplary embodiment of an echo canceller 160. Echo canceller 160 can be roughly divided into two portions: a portion, shown as a dashed block 161, used to compute the characteristics of an adaptive filter and a portion, shown as a dashed block 162, used to cancel echo. In FIG. 3, the symbol k is used to represent sample numbers. For convenience, sampling is performed periodically. Thus, the time to sample a signal is determined by the product of the symbol k and the sampling period. The sampled data representing signals x(t) and d(t) are presented by X(k) and d(k), respectively. The sampled data X(k) is delayed by a first interval (shown as block 164). This set of data is used to remove echo (as explained in more details later in connection with block 162). Another delay is introduced (shown as block 166). The twice-delayed data is used to compute a set of weights W(k), shown as block 168, that represents the characteristics of the adaptive filter. The sampled data representing received signal, d(k) is delayed once (shown as block 170) in the computation of W(k). In an embodiment, the delay intervals in blocks 166 and 170 are the same.

The set of formulas for the computation of W(k+1) is:

$$y(k)=X(k-(m+n))W(k); \quad (1)$$

$$e(k)=d(k-n)-y(k); \quad (2)$$

$$W(k+1)=W(k)+2\mu e(k)X(k-(m+n)); \quad (3)$$

where:
m represents the delay interval of block 164 (i.e., delay-1);
n represents the delay intervals of blocks 166 and 170 (i.e., delay-2 and delay-3); and
m>=n.

In the above equations, the symbol $\mu$ is called the "convergence factor." A large value for $\mu$ leads to faster convergence and a larger asymptotic convergence error. For example, $\mu$ can be in the range of $2^{\wedge}(-9)$ to $2^{\wedge}(-11)$. In FIG. 3, dashed block 161 is used to show the components that are used in the computation.

After n values of W(k) have been computed, they are used to compute the error estimates y(k)' for X(k). These estimates are used to remove echo based on the following set of formulas:

$$y(k)'=X(k-m)'W(k); \quad (4)$$

$$e(k)'=d(k)-y(k)'. \quad (5)$$

In FIG. 3, dashed block 162 is used to show the components that are used in the computation. A dashed line 172 connects weights block 168 and the multiplier inside block 162, indicating that n values of the weights W(k) are updated at a time and then used in equations (4) and (5).

An example is used to illustrate the operation of the above equations. Delay-1 is used to set the minimum path length, which can be set at 25 ms. For a sample rate of 8K per second, delay-1 (i.e., m) is 200 samples. In the calculation, delay-1 moves the window of operation.

In an embodiment, the maximum value of n is selected to give a total delay of less than 25 ms. In this example, n is selected to be 128, which will lag the coefficient update by 16 ms.

The weights, W(k), are initially set to zero and remain zero until 328 samples of X(k) have been received. The estimates, y(k)', are also set to zero until sample 328. As a result, e(k)' is equal to d(k) for the first 328 samples.

After 328 (i.e., 200+128) samples of X(k) and d(k) have been received, all the delay paths are full and hence processing can begin. The weights, W(k), can be calculated using equations (1)–(3) based on X(k) samples 1 to 128 and d(k) samples 201 to 328. Equation (4) is used to estimate y(k) for samples 329 to 456 based on X(k) samples 129 to 256. These estimates are then used to cancel the echo on d(k) samples 329 to 456 using equation (5).

The method of the present invention is especially useful when implemented using an FPGA. Because of the relatively limited memory size in current FPGAs, digitized data is preferably stored in a memory chip outside of the FPGAs.

Figure 4:
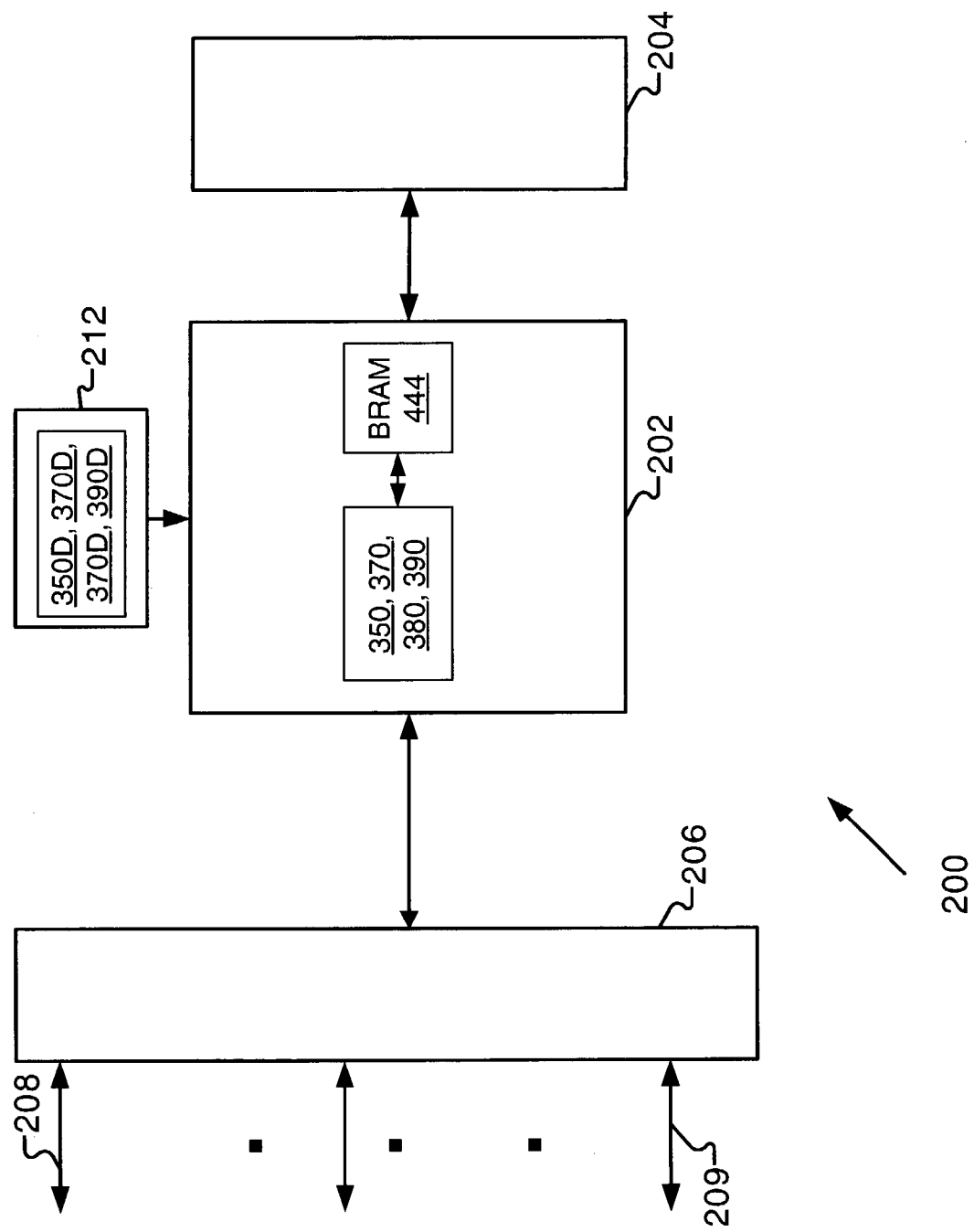
FIG. 4 is a block diagram depicting an exemplary embodiment of an implementation of an echo canceller in an FPGA.

FIG. 4 is a block diagram depicting an exemplary embodiment of an implementation 200 of an echo canceller using an FPGA 202. An external memory 204 (such as a double data rate dynamic random access memory) is coupled to FPGA 202. In an embodiment, only one memory device is used, although other embodiments can employ more than one memory device. FPGA 202 accepts digital data from a telephonic data source 206. Source 206 accepts many voice channels (such as channels 208 and 209) and combines them into a sequence of data for processing by FPGA 202. Each channel may be similar to the portion of the telephone communication system shown in FIG. 2. Implementation 200 also includes a configuration memory 212 that configures FPGA 202 to perform the algorithm stated in equations 1–5. Notably, FPGA 202 can include internal memory, including random access memory, such as block random access memory ("BRAM") 444.

Assuming that an FPGA is used to process 1000 voice channels, where each has 128 ms of path delay and 8000 samples per second are taken, memory bandwidth is reduced substantially from as high as 24.6 G words/second for a 1024 tap adaptive filter, by allowing 128 or more consecutive samples to be burst processed for the same channel.

In an embodiment, the maximum value of n is selected to give a total delay of less than 25 ms. This selection allows compliance with a version of the ITU-T (ITU Telecommunication Standardization Sector) G.168 specification, which states that an echo length of less than 25 ms need not be cancelled. In a substantial number of applications, n=128 can be selected to meet this version of ITU-T G.168. This will lag the coefficient update by 16 ms and mean that the minimum echo path is 16 ms. Accordingly, memory bandwidth in such a system can be reduced by a factor of approximately 100.

The memory size requirement is determined by the length of the adaptive filter (i.e., number of taps). This length is determined by the minimum to maximum echo path that is being cancelled. For an echo path of 25 ms to 150 ms, a 1000 tap filter can be used. If an echo path of 64 ms or 128 ms is chosen, adaptive filters of lengths of 512 taps and 1024 taps, respectively, can be used.

Memory storage is used for the tap coefficients, the transmitted voice data, the received voice data and the echo estimates. The storage (Mem_size) can be calculated by:

Mem_size=channels*(taps+(taps+3$n$)+2$n$+2$n$)=channels*(2*taps+7*$n$).

Hence as n increases the storage per channel increases by 7n (words).

Assuming taps=512, n=128, channels=1000 and words are 16 bits, the memory size is given by:

Mem_size=1000*(2*512+7*128)*16=30,720,000 MBits of storage.

The memory bandwidth (Mem_bw) is calculated by:

Mem_bw=channels*sample_rate*(2*(taps/$n$)+((taps/$n$)+3) +2+2=channels*sample_rate*(3*taps/$n$+ 7).

Assuming taps=512, n=128, channels=1000, sample_rate=8000 and the memory is one word wide, the memory bandwidth is:

Mem_bw=1000*8000*(3*512/128+7)=152,000,000 words per second, which is significantly less than the 24.6 G words/second bandwidth using conventional echo cancellation.

The above-description assumes a minimum echo path delay of 16 ms or more. What follows is a description of echo cancellation for path delays of 16 ms or less. Furthermore, it will be appreciated that though a least mean squared ("LMS") adaptive finite impulse response ("FIR") filter, or more particularly a block LMS ("BLMS") adaptive FIR filter, is described, it should be understood that any of a variety of well-known adaptive FIR filters, such as recursive least squares, affine projection and lattice based, among others, can be used. Moreover, though an adaptive FIR filter is described for operation in the time domain, it should be understood that an adaptive FIR filter that operates in the frequency domain can be used. More generally, one or more aspects of the invention can be used in any system in which response is time-invariant and linear to remove a reflected signal estimate. Accordingly, it should be appreciated that this extends to applications other than echo cancellation in telephonic systems, but applies to any system in which signal reflection may be present.

Figure 5:
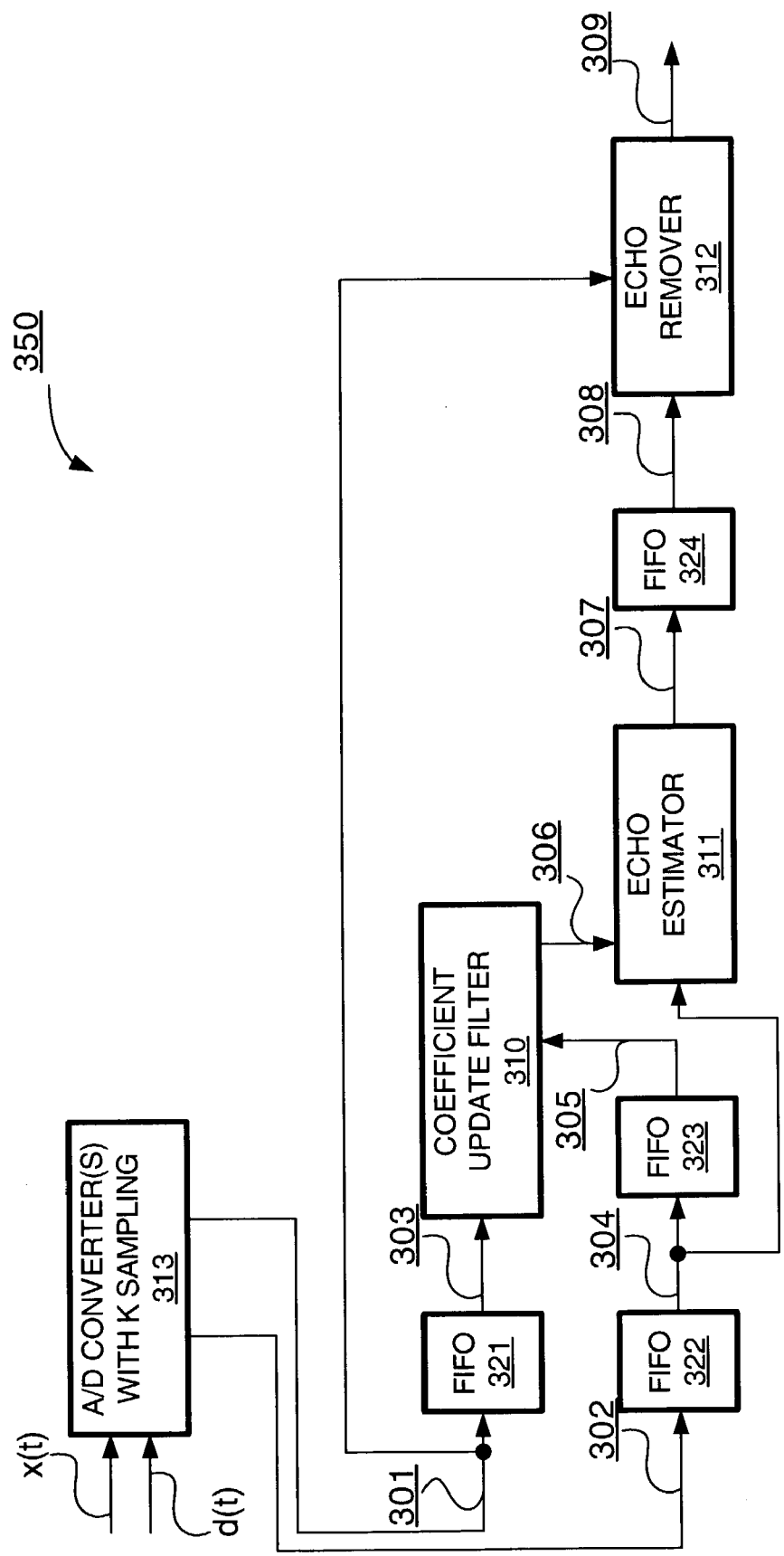
FIG. 5 is a block diagram depicting an exemplary embodiment of an echo canceller having a single stage of echo estimation.

FIG. 5 is a block diagram depicting an exemplary embodiment of an echo canceller 350 having a single stage of echo estimation. As described above, transmit signal X(t) and receive signal d(t) are converted from analog to digital ("A/D") using one or more A/D converters 313, sampling such signals X(t) and d(t) k times per second to respectively produce signals X(k) and d(k), re-labeled as signals 302 and 301, respectively.

Receive signal 301 is provided to delay 321 and to echo remover 312. For purposes of clarity, delays are described as implemented as a first-in, first out buffers ("FIFOs"). However, it should be understood that other well-known data storage circuits can be used.

FIFO 321 buffers received data 301, including any echoed data of transmit signal 302. For purposes of clarity by example, FIFO 321 buffers 128 samples of received data 301 at a time, namely, FIFO 321 is 128 entries deep, to provide approximately a 16 ms delay. The 128 samples is for a minimum echo path length delay of approximately 16 ms for a telephonic system operating at 8 kilo-Hertz ("kHz") for x(t) and d(t). It should be understood that FIFOs described herein operate responsive to clock signals, not shown for clarity, where such clock signals are substantially faster than 8 kHz. Received data 301 is serially clocked out of FIFO 321 in 128 sample or bit blocks, output 303, to coefficient updater 310. Coefficient updater 310 includes an adaptive FIR operating in block format to reduce system memory bandwidth.

Transmit data 302 is provided to FIFO 322 for buffering. FIFO 322 buffers 128 samples to introduce a 16 ms delay. Accordingly, FIFO 322 mirrors echo path delay, which in this example is minimally 16 ms. Output 304 of FIFO 322 is provided in 128 bit serial blocks to FIFO 323 and to echo estimator 311. FIFO 323 buffers 128 samples to introduce approximately a 16 ms delay. Output 305 of FIFO 323 is provided in 128 bit serial blocks to coefficient updater 310. Table I below summarizes the total delays for the above example.

TABLE I

| Signal Ref. No. | Min. Echo Path Delay (ms) | FIFO 321 Delay (ms) | FIFO 322 Delay (ms) | FIFO 323 Delay (ms) | Total Delay (ms) |
|---|---|---|---|---|---|
| 301 | 16 | | | | 16 |
| 302 | | | | | 0 |
| 303 | 16 | 16 | | | 32 |
| 304 | | | 16 | | 16 |
| 305 | | | 16 | 16 | 32 |

From Table I, it may be seen that inputs 303 and 305 to coefficient updater 310 are the same for a minimum echo path delay of 16 ms. Furthermore, it may be seen from Table I that respective inputs 301 and 304 to echo remover 312 and echo estimator 311 are the same as a minimum echo path delay, which in this example is 16 ms. Moreover, it may be seen from Table I that coefficient updater 310 lags 16 ms behind echo estimator 311 and echo remover 312 with respect to data samples, thereby ensuring coefficient updater 310 will have transmit data to process.

Coefficient updater 310, in response to signal inputs 303 and 305, provides signal output 306 to echo estimator 311. Echo estimator 311, responsive to inputs 304 and 306, provides output 307 to FIFO 324. Notably, for a minimum echo path length of 16 ms, echo estimator 311 uses block processing to provide output 307 to FIFO 324. FIFO 324 is 128 entries deep, from which 128 bit blocks are serially clocked out as output 308 to echo remover 312. Thus, FIFO 324 output 308 is delayed 16 ms. Echo canceller 312, responsive to input signals 301 and 308, provides echo removed signal 309. Echo removed signal 309 is at least approximately an echo free signal. Notably, coefficient updater 310 includes portions of echo estimator 311 and echo remover 312, which is described in more detail in FIG. 6.

Figure 6:
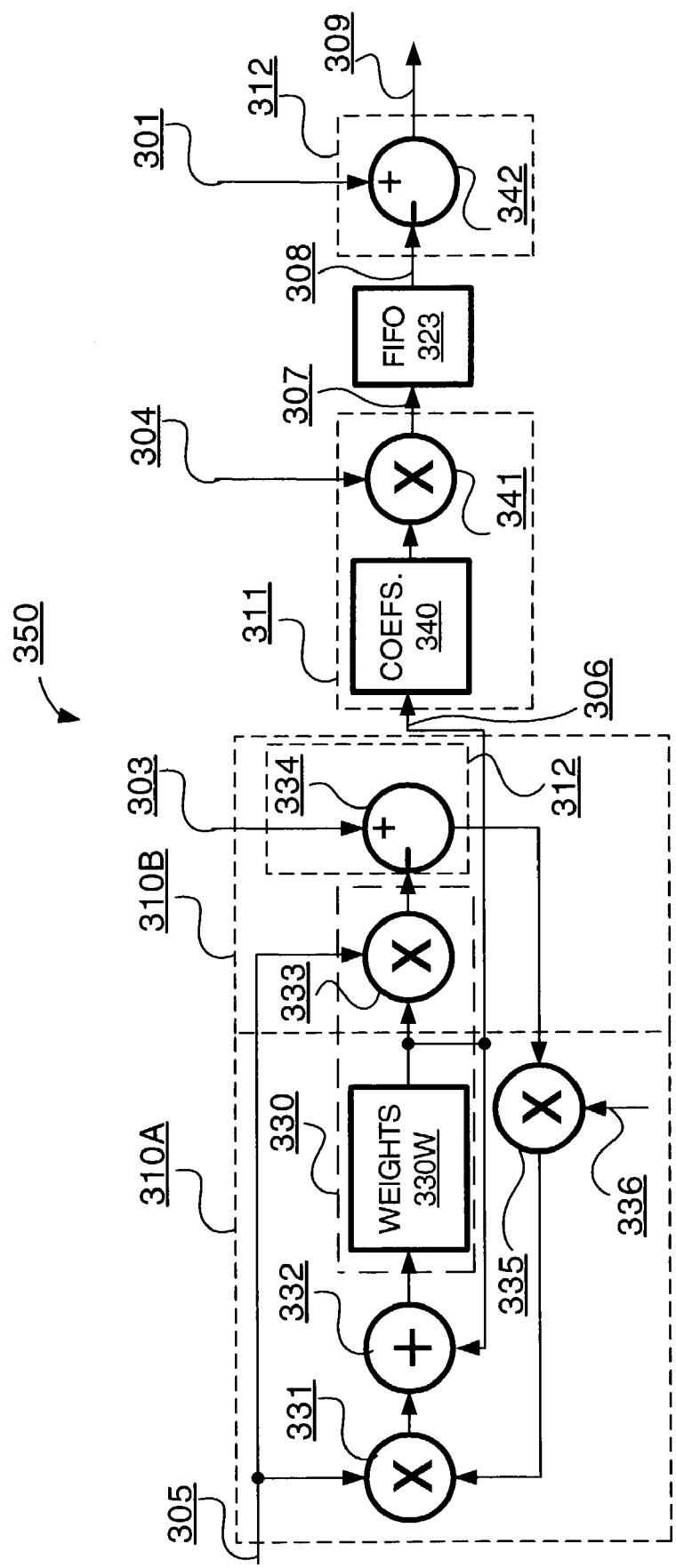
FIG. 6 is a lower-level block diagram depicting a portion of the echo canceller of FIG. 5.

FIG. 6 is a lower-level block diagram depicting a portion of echo canceller 350 of FIG. 5. As indicated above, coefficient updater 310 includes coefficient updater portion 310A and an echo estimator/remover portion 310B.

Input signal 305 (X(k)) is provided to multipliers 331 and 333. The output of multiplier 331 is provided to adder 332. The output of adder 332 is provided to weights 330W of adaptive FIR 330. Output 306 (W(k)) from weights 330W of adaptive FIR 330 is provided to multiplier 333 and fed back to adder 332. Thus, adder 332 adds output of multiplier 331 to feedback output of weights 330W of adaptive FIR 330 to provide an input to weights 330W of adaptive FIR 330.

Multiplier 333 multiplies output of weights 330W with input signal 305 to form an adaptive FIR 330 with output (y(k)). Output (y(k)) is provided to subtractor 334. Output of multiplier 333 is subtracted from input signal 303 by subtractor 334 to provide an error output (e(k)) to multiplier 335. Output of subtractor 334 is multiplied by convergence factor signal (μ) 336 by multiplier 335 to provide output to multiplier 331. Multiplier 331 multiplies input signal 305 with attenuated output of subtractor 334 from multiplier 335 to provide output to adder 332. Adder 332 is used to adapt adaptive weights or coefficients 330W.

Output 306 is provided to coefficients 340 to update coefficients 340. For example, coefficients 340 can be updated approximately at each 16 ms interval. This updating of coefficients in response provides output (W(k)') to multiplier 341 for multiplication with input 304 to produce output 307 (y(k)'). Output of multiplier 341 is provided to FIFO 323 for delay, from which output 308 is obtained. Output 308 is subtracted from input 301 by subtractor 342 to produce echo removed signal 309 (e(k)').

The above signal processing description can be described mathematically as:

$$y(k) = X(k-n)W(k); \quad (6)$$

$$e(k) = d(k-n) - y(k); \quad (7)$$

$$W(k+1) = W(k) + 2\mu[e(k)X(k-n)]; \quad (8)$$

$$y(k)' = X(k)'W(k)'; \quad (9)$$

$$e(k)' = d(k) - y(k)'; \text{ and} \quad (10)$$

$$W(k)' = W(k-n); \quad (11)$$

where n equals delay in samples. Notably, if desired, subtractor 342 may be omitted or selectively uncoupled to decouple echo cancellation, for example for certain tones, such as for receipt of a fax, which deactivate an echo-cancellation function.

Figure 7:
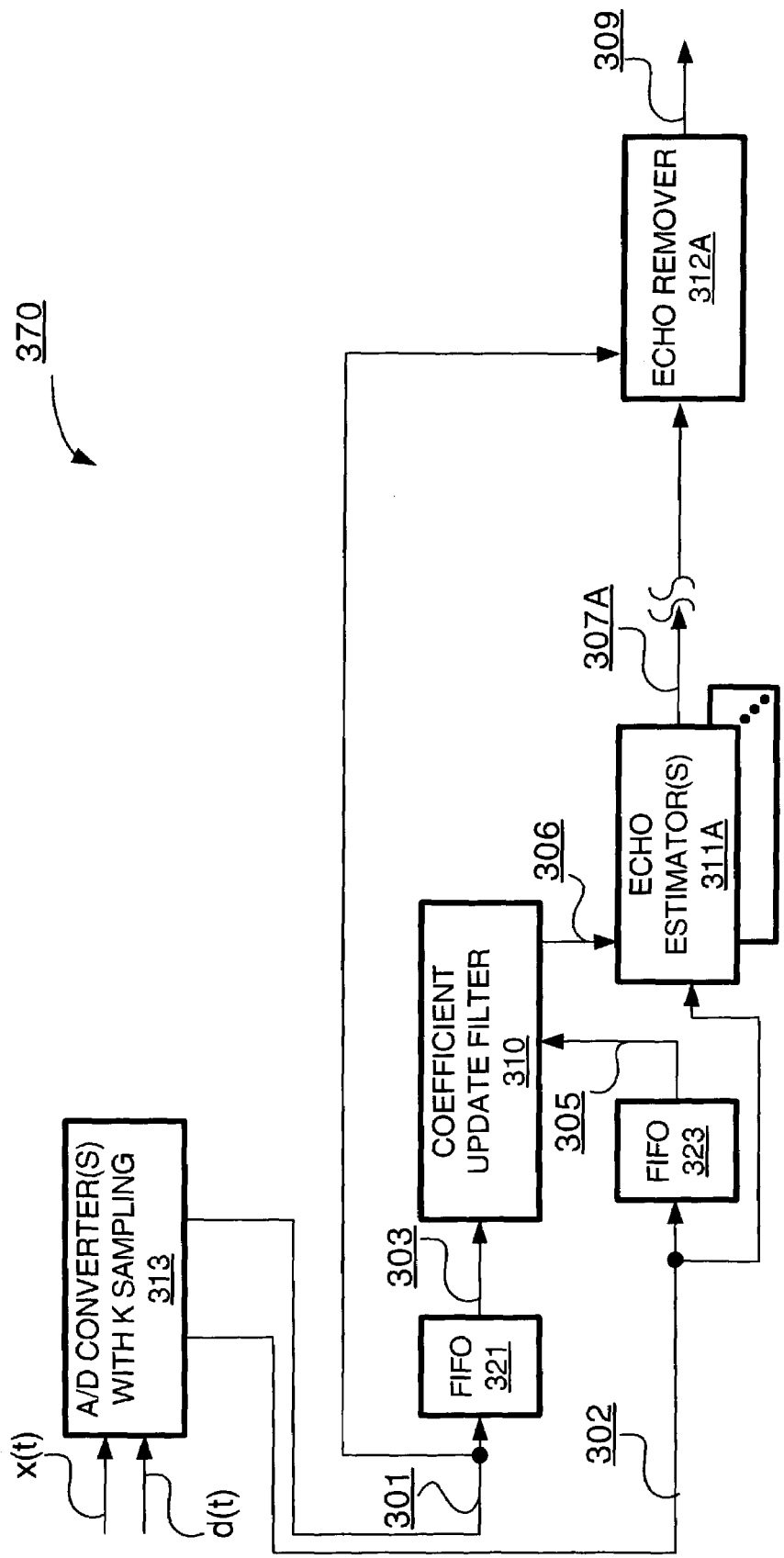
FIG. 7 is a block diagram depicting an exemplary embodiment of an echo canceller having a plurality of stages of echo estimation.

FIG. 7 is a block diagram depicting an exemplary embodiment of an echo canceller 370 having a plurality of stages of echo estimation. Many of the elements of echo canceller 370 were described with respect to echo canceller 350 of FIG. 5, and thus are not repeated. In this exemplary embodiment, there is a minimum echo path length delay of 0 ms or approximately 0 ms. Because the minimum path length is zero, there can be no delay of transmit data 302 to an echo estimator 311 of FIG. 5. Hence, FIFO 322 is removed. In other words, at least one of echo estimators 311A provides a real time output, namely, processing one sample at a time instead of blocks of samples at a time. By using a plurality of echo estimators 311A, a plurality of echo estimation outputs 307A are provided to echo remover 312A. Accordingly, the need for memory bandwidth is reduced. Exemplary embodiments for near zero and zero echo path delay are described below with reference to FIG. 8 and FIG. 9, respectively.

Figure 8:
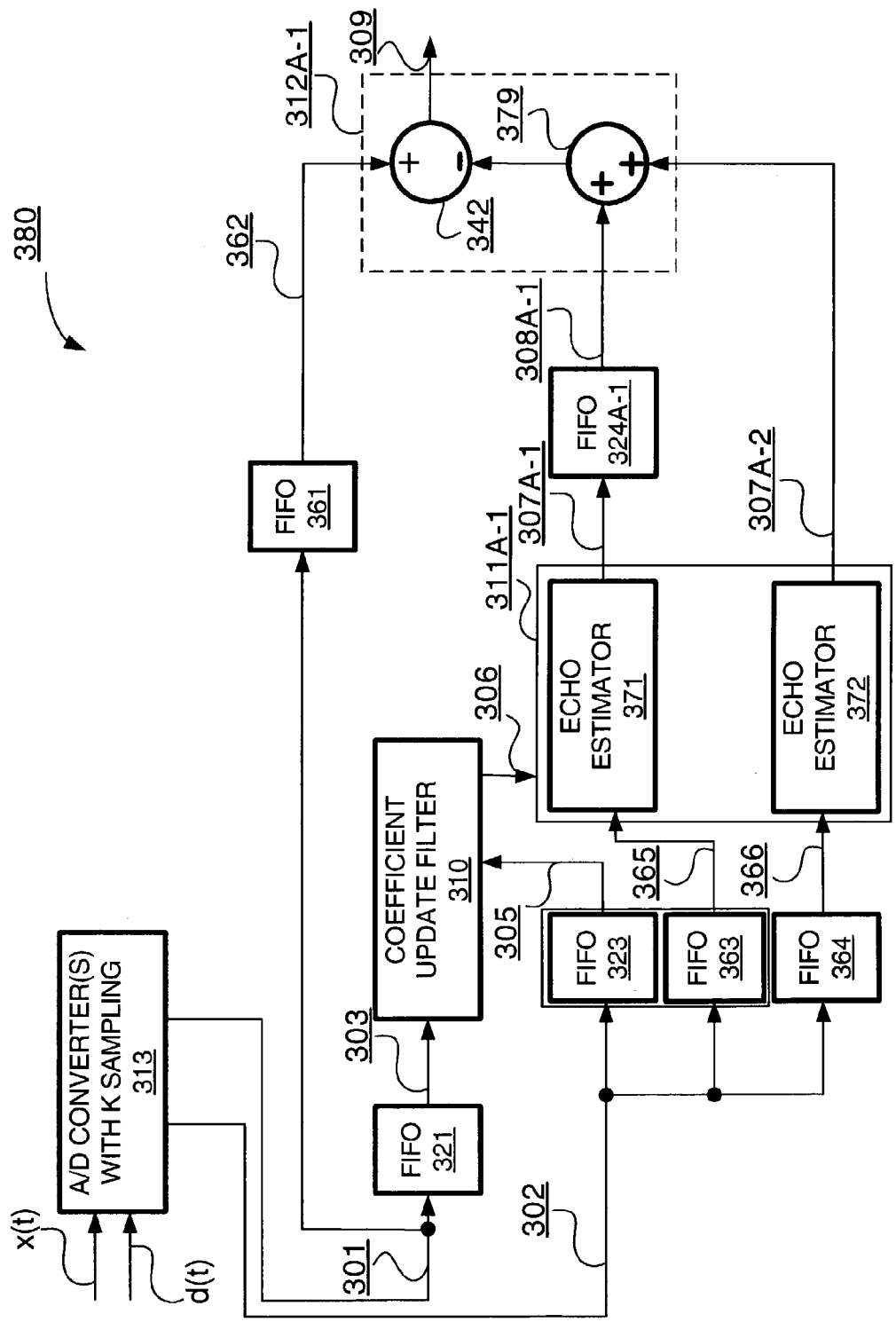
FIG. 8 is a block diagram depicting an exemplary embodiment of an echo canceller having two stages of echo estimation.

FIG. 8 is a block diagram depicting an exemplary embodiment of an echo canceller 380 having two stages of echo estimation. As much of the description of echo canceller 380 is the same as for echo canceller 350 of FIG. 5, it is not repeated. Coefficient updater 310 provides updated coefficients, as delayed for a delay of FIFOs 321 and 323, to echo estimators 311A-1. Transmit data 302 is provided to FIFOs 323, 363 and 364. However, whereas FIFOs 323 and 363 provide approximately a 16 ms delay, namely, 128 entries deep, FIFO 364 provides a delay closer to zero, for example approximately a 0.5 ms delay, namely, 4 entries deep. Receive data 301 is provided to FIFOs 321 and 361. For sample data alignment, FIFO 361 provides the same delay as FIFO 364. Output of FIFO 361 is provided to subtractor 342 of echo remover 312A-1.

Output 365 is serially clocked out of FIFO 363 in 128 bit bursts to echo estimator 371 of echo estimator 311A-1. Output 366 is serially clocked out of FIFO 364 one bit at a time for real time processing by echo estimator 372 of echo estimator 311A-1. In other words, echo estimator 372 processes data received from FIFO 364 as it arrives. Breaking echo estimation up into a block based partial echo estimation by echo estimator 371 and a real time partial echo estimation by echo estimator 372 facilitates a minimum echo path delay of less than 16 ms.

Output 307A-1 of echo estimator 371 is provided to FIFO 324A-1, for example in 128 bit bursts. Output 308A-1 of FIFO 324A-1 is provided one sample at a time to adder 379 of echo remover 312A-1. Output 307A-2 of echo estimator 372 is provided to adder 379 one sample at a time for adding to output 308A-1. Output of adder 379 is provided to subtractor 342 of echo remover 312A-1 for subtracting from output 362 of FIFO 361 to provide echo removed output 309.

For an adaptive FIR filter having 128 taps for a 128 ms tail, 1024 coefficients are used to cancel echo, where division of echo estimation into two stages can be mathematically expressed as:

$$\sum_{k=0}^{k=1023} W(k) \cdot X(k) = \sum_{k=0}^{k=m-1} W(k) \cdot X(k) + \sum_{k=m}^{k=1023} W(k) \cdot X(k). \quad (12)$$

The first term of Equation 12 is calculated in real time. Notably, the second term of Equation 12 is block processed, which advantageously can be done while weights are be calculated to conserve data bandwidth to memory.

If a 0.5 ms echo path delay were allowable in a receive path to buffer incoming data, and then process data through a 128 tap filter, 512 channels could be processed within a 266 mega-Hertz ("MHZ") bandwidth to memory (i.e., (128 (coefficients)+128 (data samples)) *512 (channels) *8000 (sample rate)/4 (samples)=262.144 MHz). This bandwidth can be halved, as the amount of data needed depends in part on the time since a last block processing by echo estimator 371 (e.g., 1d+1p, 2d+2p, . . . 128d+128p, for d meaning coefficient and p meaning partial result). In other words, each channel is staggered so bandwidth averages down to half the value (e.g., approximately 131 MHz).

Notably, as FIFOs 323 and 363 buffer the same signal and have the same delay, they can be one buffer having its output sent to both coefficient updater 310 and echo estimator 371.

Figure 9:
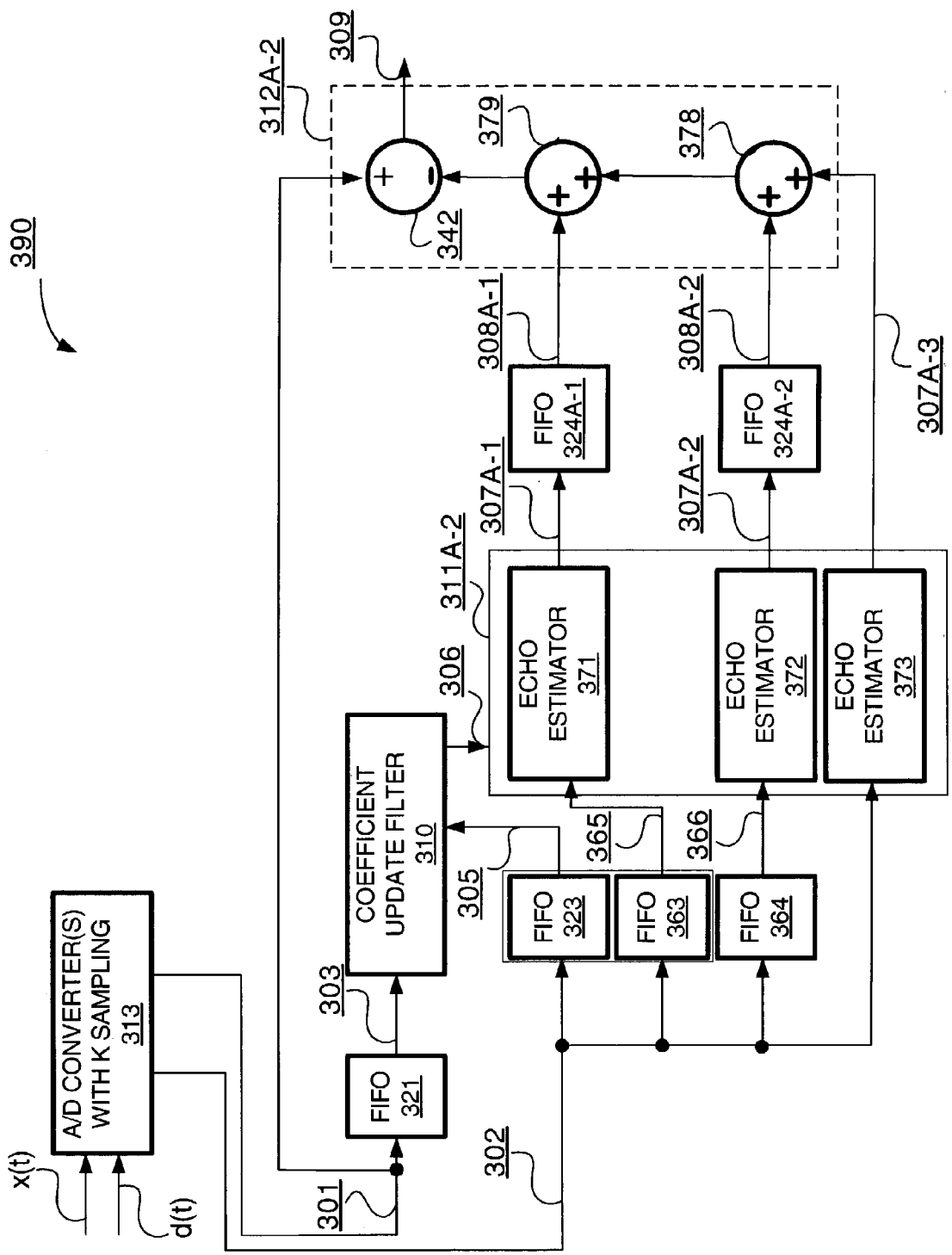
FIG. 9 is a block diagram depicting an exemplary embodiment of an echo canceller having three stages of echo estimation.

FIG. 9 is a block diagram depicting an exemplary embodiment of an echo canceller 390 having three stages of echo estimation. As much of the description of echo canceller 390 is the same as for echo canceller 380 of FIG. 8, it is not repeated.

Coefficient updater 310 provides updated coefficients, as delayed for a delay of FIFOs 321 and 323, to echo estimators 311A-2. Transmit data 302 is provided to FIFOs 323, 363 and 364, and to echo estimator 373. Furthermore, there is no delay inserted between receive data 301 and echo remover 312A-2. Accordingly, echo estimator 373 is for real time partial echo estimation, and echo estimators 371 and 372 are for major and minor block partial echo estimation, respectively. Whereas FIFOs 323 and 363 provide approximately a 16 ms delay, namely, 128 entries deep, for block outputs 305 and 365, output 366 of FIFO 364 is delayed closer to zero, for example approximately a 1 ms delay, namely, an 8 entry deep FIFO 364. In this configuration, block processing can be done for coefficient update processing and the bulk of echo estimation processing. The remainder of echo estimation processing is done as data arrives to echo estimator 373, thereby allowing for a minimum echo path delay of zero ms.

Echo estimator 311-A2 includes three stages, namely, echo estimator 371, echo estimator 372 and echo estimator 373. Output 307A-1 of echo estimator 371 is done in blocks, such as 128 bit blocks, to FIFO 324A-1, from which output 308A-1 is obtained. Output 307A-2 of echo estimator 372 is done in blocks, such as 8 bit blocks, to FIFO 324A-2, from which output 308A-2 is obtained. The maximum delays of FIFOs 324A-1 and 324A-2 are approximately 16 ms and 1 ms, respectively, and outputs of FIFOs 324A-1 and 324A-2 are done at the sample rate. Output 307A-3 of echo estimator 373 is one bit at a time without delay, other than for echo estimation processing.

Output 308A-2 is added to output 307A-3 by adder 378 to provide input to adder 379. Input to adder 379 from adder 378 is added to input 308A-1 to provide input to subtractor 342. Output from adder 379 is subtracted from receive data 301 by subtractor 342 to provide echo removed signal 309.

This division of echo estimation processing can be mathematically represented as:

$$\sum_{k=0+n}^{k=1023+n} W(k) \cdot X(k) = \tag{13}$$

$$\sum_{k=n}^{k=m-1} W(k) \cdot X(k) + \sum_{k=m}^{k=127} W(k) \cdot X(k) + \sum_{k=128}^{k=1023+n} W(k) \cdot X(k)$$

where n equals major block size (e.g., 128) minus samples since the last major block update, where m modulus of minor block size (e.g., 8) equals zero, where minor block size is less than or equal to m which is less than or equal to major block size, and where major block size modulus of minor block size equals zero.

Figure 10:
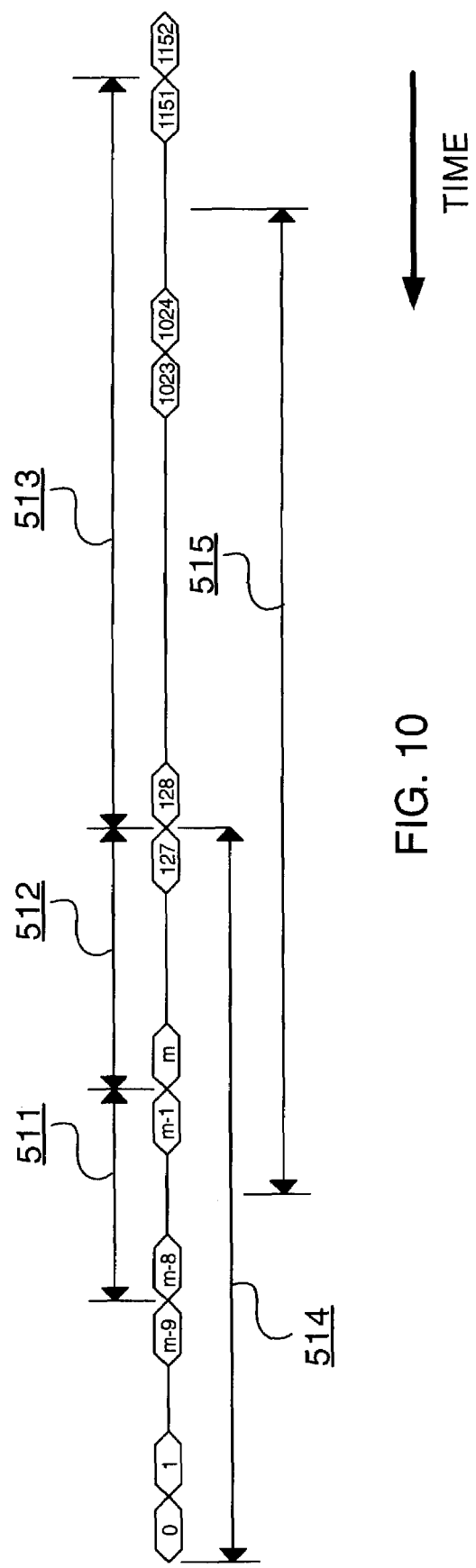
FIG. 10 is a signal diagram depicting bit processing for the echo canceller of FIG. 9.

FIG. 10 is a signal diagram depicting bit processing for echo canceller 390 of FIG. 9 with a major block size equal to 128 and a minor block size equal to 8, and with zero echo path length timing. Notably, 1153 (0 to 1152) coefficients and partial product sums, illustratively shown, are greater in number than 1024. Period 515 is an example of a 1024 tap by n long adaptive filter period (for n that is the delay associated with each tap). Period 514, for example from sums 127 to 0, is a block processing period. In this example, results 511, from sums m−1 to m−8, are real time processed echo estimations. Results 512, from sums 127 to m, are minor block processed echo estimations. Results 513, from sums 1151 to 128, are major block processed echo estimations.

Figure 11:
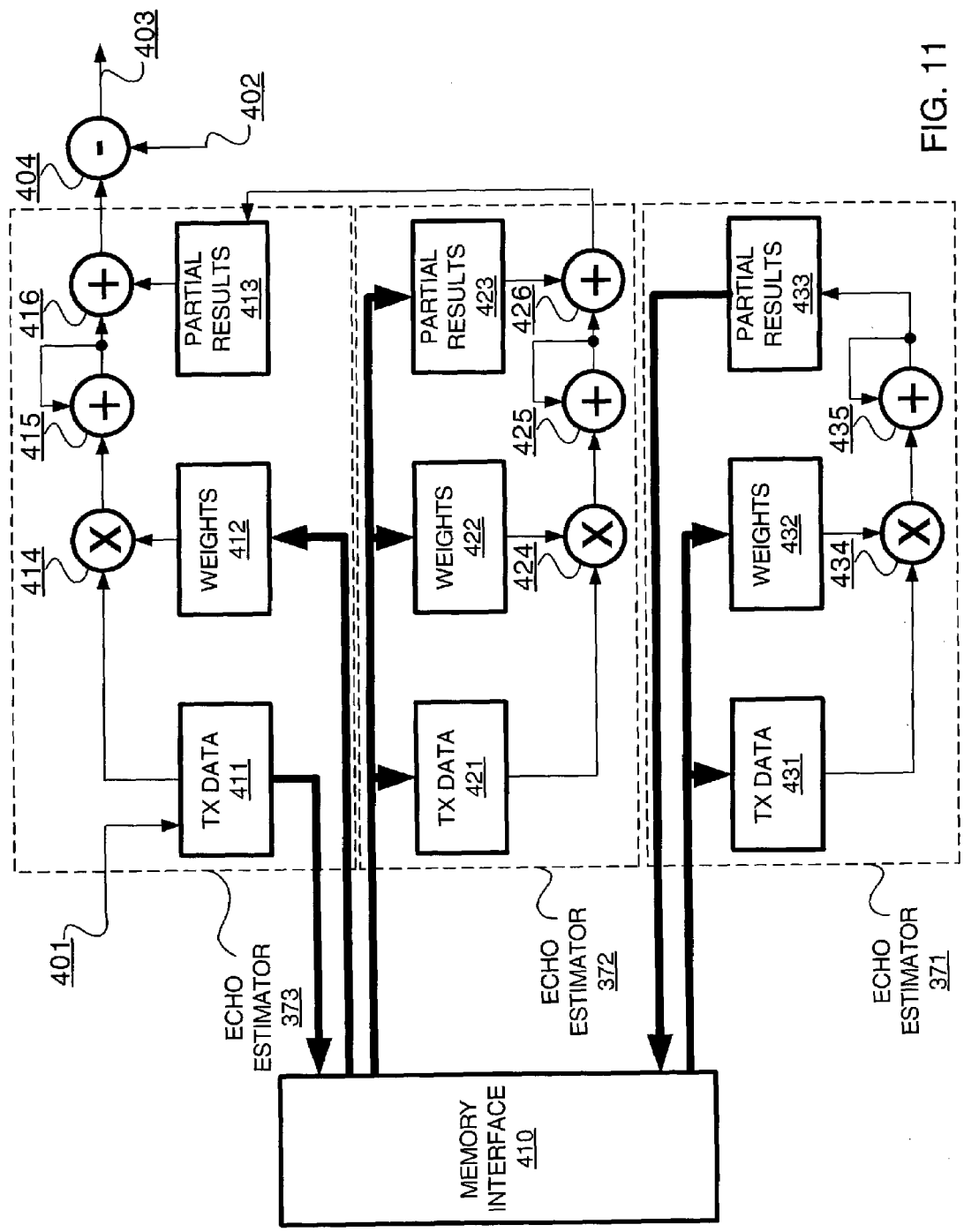
FIG. 11 is a lower-level block diagram depicting a portion of the echo canceller of FIG. 9.

FIG. 11 is a lower-level block diagram depicting a portion of the echo canceller of FIG. 9. Transmit data 401 is received at echo estimator 373, from which 8 samples of transmit ("TX") data, TX data 411, for all channels are used. By all channels, it is meant all channels in use and coupled to an echo canceller, such as via data source 206 of FIG. 4. TX data 401 is provided to memory interface 410 for external memory 204 of FIG. 4. TX data 421 and 431, stored in memory 204, are used by echo estimator 372 and echo estimator 371, as described below, along with weights, such as weights 422 and 432, from an adaptive FIR output which are stored in memory 204. With continuing reference to FIG. 11 and renewed reference to FIG. 4, the remainder of FIG. 11 is described.

TX data 411 is multiplied by 8 weights or updated coefficients 412, obtained from memory 204, by multiplier 414. Weights 412 are for all channels and are generated by a coefficient updater 310 and then stored in memory 204, from which they can be obtained. Output of multiplier 414 is provided to adder 415, where adder 415 has its output fed back to for adding to output of multiplier 414. Output of adder 415 is provided to adder 416 for adding to 8 partial results 413 from echo estimator 372. Partial results 413 are for all channels. Output of adder 416 is subtracted from receive data 402 by subtractor 404 to provide echo removed output 403 in real time.

For echo estimator 372, TX data 421, weights 422 and partial results 423 are obtained from memory 204 and all are for the same channel, namely, one selected channel. TX data 421 is 120 samples. There are 120 weights 422, and there are 8 partial results 423. It should be understood that echo estimator 372 calculates a next 8 of the minor partial results. Notably, the size of minor partial results calculated depends on the time since the last major partial results update by echo estimator 371 on each 128 samples. Thus, it is possible that more than 8 partial results 423 need to be obtained from memory 204. TX data 421 is multiplied with weights 422 by multiplier 424, the output of which is provided to adder 425 having its output fed back for addition with input from multiplier 424. Output of adder 425 is added to partial results 423 by adder 426 to provide partial results 413.

For echo estimator 371, TX data 431 and weights 432 are obtained from memory 204, and all are for the same channel, namely, one selected channel. TX data 431 is 1024 samples. There are 1024 weights 432, and 128 partial results 433 are calculated for storage in memory 204 for access by echo estimator 372 to obtain partial results 423. Notably, if an update of partial results 433 stored in memory 204 is outside of a threshold period, as many as 128 partial results 423 can be obtained. TX data 431 is multiplied with weights 432 by multiplier 434. Output of multiplier 434 is provided to adder 435, which has its output fed back for adding to output of multiplier 434. Output of adder 435 is partial results 433 which are stored in memory 204. Partial results 433 are stored in memory in association with the transmit data 431 signal samples and weights 432 from which such partial results 433 were generated.

Returning to FIG. 4, memory bandwidth can be further reduced by advantageously using BRAM 444 coupled to one or more of echo cancellers 350, 370, 380 or 390 instantiated in FPGA 202 from associated configuration data 350D, 370D, 380D or 390D, respectively, in configuration memory 212. For example, 8 BRAMs 444 can be used for 8 samples worth of data for all channels (e.g., 512 channels), which can halve memory bandwidth, and can further remove delay from a receive path. Furthermore, memory bandwidth can be saved by not reading all buffer samples (e.g., 128) during block processing from external memory 204.

Notably, approximate numerical values have been used as an aid in describing echo cancellers; however, other numerical values can be used. For example, rather than a delay of 0.5 ms, delays in a range from 0 to less than 16 ms can be used for a second, third, and so on echo estimator stage delays, where such delays are progressively shorter. Furthermore, such approximate numerical values can be changed depending on system implementation specifications, such as number of channels, available memory and length of tail, among others. However, it should be appreciated that both memory usage can be substantially reduced and real time echo cancellation can be provided. Furthermore, over 1000 channels can be supported with a single external memory 204.

Accordingly, it should be appreciated that various embodiments of signal reflection noise cancellers for communication networks, such as echo cancellers for telephonic communications systems, have been described. Furthermore, it should be appreciated that in described embodiments there is no delay in feedback error as such feedback error is part of coefficient updating. Block size therefore simply causes a lag in response time.

It can be seen from the above description that a novel echo cancellation method has been disclosed. Those having skill in the relevant arts of the present invention will now perceive various modifications and additions that can be made as a result of the disclosure herein. Accordingly, all such modifications and additions are deemed to be within the scope of the present invention, which is to be limited only by the appended claims and their equivalents. Claim listing steps do not imply any order unless expressly stated.

The invention claimed is:

1. An echo canceller, comprising:
    a first delay device having a delay, the delay associated with a number of signal samples, the first delay device coupled to receive a transmit signal;
    a second delay device having the delay, the second delay device coupled to receive a receive signal;
    a coefficient updater coupled to the first delay device and the second delay device, the coefficient updater including an adaptive finite impulse response filter to provide updated coefficients responsive to the transmit signal and the receive signal;
    an echo estimator coupled to receive the transmit signal and coupled to the coefficient updater to receive the updated coefficients, the echo estimator configured to provide an estimated echo signal responsive to the updated coefficients and the transmit signal;
    a third delay device having the delay, the third delay device coupled to the echo estimator to delay the estimated echo signal; and
    an echo remover coupled to receive the receive signal and the estimated echo signal delayed, the echo remover configured to provide the receive signal less an estimated echo associated with the estimate echo signal.

2. The echo canceller of claim 1, wherein the delay is associated with a minimum echo path delay of approximately 16 milliseconds.

3. The echo canceller of claim 2, wherein the echo estimator receives updates for the updated coefficients approximately every 16 milliseconds to provide the estimated echo signal.

4. The echo canceller of claim 1, further comprising: a fourth delay device coupled to receive the transmit signal and to provide the transmit signal to the second delay device and to the echo estimator, the fourth delay device having the delay.

5. The echo canceller of claim 4, wherein the first delay device, the second delay device, the third delay device and the fourth delay device are all respective first-in, first-out buffers.

6. The echo canceller of claim 1, wherein the echo canceller is implemented using an FPGA.

7. An echo canceller, comprising:
    a first delay device having a first delay, the first delay associated with a first number of signal samples, the first delay device coupled to receive a transmit signal;
    a second delay device having the first delay, the second delay device coupled to receive a receive signal;
    a coefficient updater coupled to the first delay device and the second delay device, the coefficient updater including an adaptive finite impulse response filter to provide updated coefficients responsive to the transmit signal and the receive signal;
    a first stage echo estimator coupled to the first delay device to receive the transmit signal delayed by the first delay and coupled to the coefficient updater to receive the updated coefficients, the first stage echo estimator configured to provide a first estimated echo signal responsive to the updated coefficients and the first number of signal samples of the transmit signal;
    a third delay device having the first delay, the third delay device coupled to the first stage echo estimator to delay the first estimated echo signal;
    a fourth delay device having a second delay, the fourth delay device coupled to receive the transmit signal, the second delay associated with a second number of signal samples, the second number of signal samples being fewer than the first number of signal samples and the second delay being shorter than the first delay;
    a second stage echo estimator coupled to the fourth delay to receive the transmit signal delayed by the second delay, the second stage echo estimator configured to provide a second estimated echo signal responsive to a portion of the updated coefficients and the second number of signal samples of the transmit signal;
    a fifth delay device having the second delay, the fifth delay device coupled to receive the receive signal; and
    an echo remover coupled to receive the receive signal delayed by the fifth delay device, the first estimated echo signal delayed by the third delay device and the second estimated echo signal provided by the second stage echo estimator, the echo remover configured to subtract from the receive signal the first estimated echo signal and the second estimated echo signal to provide the receive signal less an estimated echo associated with the first estimate echo signal and the second estimated echo signal.

8. The echo canceller of claim 7, wherein the first delay is associated with a minimum echo path delay of approximately 16 milliseconds, and wherein the second delay is greater than zero.

9. The echo canceller of claim 8, wherein the first delay device comprises two separate first-in, first-out buffers having respective outputs, and wherein a first output of the outputs is provided to the coefficient updater, and a second output of the outputs is provided to the first stage echo estimator.

10. The echo canceller of claim 7, wherein the echo canceller is implemented using an FPGA.

11. An echo canceller, comprising:
a first delay device having a first delay, the first delay associated with a first number of signal samples, the first delay device coupled to receive a transmit signal;
a second delay device having the first delay, the second delay device coupled to receive a receive signal;
a coefficient updater coupled to the first delay device and the second delay device, the coefficient updater including an adaptive finite impulse response filter to provide updated coefficients responsive to the transmit signal and the receive signal;
a first stage echo estimator coupled to the first delay device to receive the transmit signal delayed by the first delay and coupled to the coefficient updater to receive the updated coefficients, the first stage echo estimator configured to provide a first estimated echo signal responsive to the updated coefficients and the first number of signal samples of the transmit signal;
a third delay device having the first delay, the third delay device coupled to the first stage echo estimator to delay the first estimated echo signal;
a fourth delay device having a second delay, the fourth delay device coupled to receive the transmit signal, the second delay associated with a second number of signal samples, the second number of signal samples being fewer than the first number of signal samples and the second delay being shorter than the first delay;
a second stage echo estimator coupled to the fourth delay device to receive the transmit signal delayed by the second delay, the second stage echo estimator configured to provide a second estimated echo signal responsive to at least a first portion of the updated coefficients and the second number of signal samples of the transmit signal;
a fifth delay device having the second delay, the fifth delay device coupled to the second stage echo estimator to delay the second estimated echo signal;
a third stage echo estimator coupled to receive the transmit signal, the third stage echo estimator configured to provide a third estimated echo signal responsive to a second portion of the updated coefficients, the second portion less than the first portion; and
an echo remover coupled to receive the receive signal, the first estimated echo signal delayed by the third delay device, the second estimated echo signal delayed by the fifth delay device and the third estimated echo signal, the echo remover configured to subtract from the receive signal the first estimated echo signal, the second estimated echo signal and the third estimated echo signal to provide the receive signal less an estimated echo associated with the first estimate echo signal, the second estimated echo signal and the third estimated echo signal.

12. The echo canceller of claim 11, wherein the first delay is associated with a minimum echo path delay of approximately 16 milliseconds, and wherein the second delay is greater than zero.

13. The echo canceller of claim 12, wherein the third stage echo estimator processes the transmit signal in real time to provide the third estimated echo signal.

14. The echo canceller of claim 13, wherein the first delay device comprises two separate first-in, first-out buffers having respective outputs, and wherein a first output of the outputs is provided to the coefficient updater, and a second output of the outputs is provided to the first stage echo estimator.

15. The echo canceller of claim 11, wherein the echo canceller is implemented using an FPGA.

16. A method for reducing effects associated with a reflected signal, comprising:
adaptive finite impulse response filtering to provide weights for transmit data signal samples;
calculating partial results responsive to the transmit data signal samples and the weights for a first number of samples;
obtaining a first portion of the partial results and a first portion of the transmit data signal samples and the weights associated therewith;
calculating second partial results responsive to the first portion of the partial results and the first portion of the transmit data signal samples and the weights associated therewith, the second partial results fewer in number of results than the first portion of the partial results;
obtaining the second partial results associated with a second portion of the transmit data signal samples and the weights associated therewith; and
calculating an estimate of signal reflection responsive to the second partial results associated with the second portion of the transmit data signal samples and the weights associated therewith.

17. The method of claim 16, wherein the first portion of the partial results are fewer in number of results than the partial results.

18. The method of claim 17, wherein the partial results, the first portion of the partial results and the second partial results respectively number 128, 120 and 8.

19. The method of claim 16, wherein the estimate of signal reflection is calculated in real time.

20. The method of claim 16, further comprising subtracting the estimate of signal reflection from a received signal.

* * * * *